US009638027B2

(12) United States Patent
Roberson

(10) Patent No.: US 9,638,027 B2
(45) Date of Patent: May 2, 2017

(54) ANTENNA FOR DOWNHOLE COMMUNICATION USING SURFACE WAVES

(71) Applicant: HALLIBURTON ENERGY SERVICES, INC., Houston, TX (US)

(72) Inventor: Mark W. Roberson, Cary, NC (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 15/123,078

(22) PCT Filed: Mar. 11, 2015

(86) PCT No.: PCT/US2015/019868

§ 371 (c)(1),
(2) Date: Sep. 1, 2016

(87) PCT Pub. No.: WO2016/144348

PCT Pub. Date: Sep. 15, 2016

(65) Prior Publication Data

US 2017/0016317 A1 Jan. 19, 2017

(51) Int. Cl.

*G01V 3/00* (2006.01)
*E21B 47/12* (2012.01)
*H01Q 13/20* (2006.01)

(52) U.S. Cl.

CPC ............ *E21B 47/12* (2013.01); *E21B 47/122* (2013.01); *H01Q 13/20* (2013.01)

(58) Field of Classification Search

None

See application file for complete search history.

(56) References Cited

U.S. PATENT DOCUMENTS 4,390,975 A 6/1983 Shawhan
5,148,408 A 9/1992 Matthews
(Continued)

FOREIGN PATENT DOCUMENTS

EP 560893 11/1996
EP 1224710 4/2004
(Continued)

OTHER PUBLICATIONS

Barlow et al., Surface Waves, IEEE Radio Section, Paper No. 1482, Apr. 22, 1953, 13 pages.
(Continued)

*Primary Examiner* — Curtis King
(74) *Attorney, Agent, or Firm* — Kilpatrick Townsend & Stockton LLP

(57) ABSTRACT

An assembly can include a casing string with an outer surface. The assembly can also include an antenna for wirelessly communicating data by generating a surface wave that propagates along an interface surface. The antenna can be positioned coaxially around the casing string. The antenna can include a cylindrically shaped conductor that is positionable coaxially around an outer surface of a casing string for generating a magnetic field component of the surface wave that is non-transverse to a direction of propagation of the surface wave along the interface surface. The antenna can also include a pair of conductive plates positioned at an angle to the cylindrically shaped conductor for generating an electric field component of the surface wave.

20 Claims, 8 Drawing Sheets

(56) References Cited

U.S. PATENT DOCUMENTS

| | | | | |
|---|---|---|---|---|
| 5,926,024 | A * | 7/1999 | Blount | G01N 22/00 324/324 |
| 6,371,204 | B1 * | 4/2002 | Singh | E21B 21/00 166/250.03 |
| 6,426,917 | B1 * | 7/2002 | Tabanou | E21B 7/061 324/333 |
| 6,691,779 | B1 * | 2/2004 | Sezginer | E21B 7/06 166/250.01 |
| 6,714,153 | B1 * | 3/2004 | Kong | G01V 3/30 324/323 |
| 9,360,582 | B2 * | 6/2016 | Bittar | G01V 3/28 |
| 2002/0171560 | A1 * | 11/2002 | Ciglenec | E21B 7/061 340/853.1 |
| 2002/0195247 | A1 * | 12/2002 | Ciglenec | E21B 7/06 166/250.11 |
| 2003/0206026 | A1 | 11/2003 | Diakonov et al. | |
| 2004/0112595 | A1 * | 6/2004 | Bostick, III | E21B 21/08 166/250.01 |
| 2004/0252748 | A1 | 12/2004 | Gleitman et al. | |
| 2006/0290529 | A1 | 12/2006 | Flanagan et al. | |
| 2008/0030365 | A1 | 2/2008 | Fripp et al. | |
| 2008/0205191 | A1 | 8/2008 | Coste et al. | |
| 2008/0217057 | A1 | 9/2008 | Hall et al. | |
| 2009/0081971 | A1 | 3/2009 | Rofougaran et al. | |
| 2010/0002675 | A1 | 1/2010 | Fu et al. | |
| 2010/0177596 | A1 | 7/2010 | Fink et al. | |
| 2010/0194586 | A1 | 8/2010 | Tjhang et al. | |
| 2010/0223988 | A1 | 9/2010 | Crow et al. | |
| 2011/0030946 | A1 | 2/2011 | Upshall et al. | |
| 2011/0192598 | A1 * | 8/2011 | Roddy | E21B 33/13 166/253.1 |
| 2011/0251813 | A1 | 10/2011 | Coman et al. | |
| 2011/0308794 | A1 * | 12/2011 | Bittar | G01V 3/26 166/254.2 |
| 2012/0013893 | A1 | 1/2012 | Maida et al. | |
| 2013/0027042 | A1 | 1/2013 | Meignant et al. | |
| 2013/0154650 | A1 * | 6/2013 | Bittar | E21B 47/02216 324/336 |
| 2013/0257629 | A1 | 10/2013 | Hallundbæk et al. | |
| 2013/0334894 | A1 * | 12/2013 | Borgen | E21B 47/122 307/104 |
| 2014/0174732 | A1 * | 6/2014 | Goodwin | E21B 33/13 166/255.1 |
| 2014/0191761 | A1 * | 7/2014 | San Martin | E21B 47/011 324/339 |
| 2014/0246237 | A1 | 9/2014 | Prammer | |
| 2014/0306853 | A1 * | 10/2014 | Purkis | G06K 7/10336 343/719 |
| 2014/0354443 | A1 * | 12/2014 | Roberson | E21B 47/122 340/853.2 |
| 2014/0354446 | A1 | 12/2014 | Nakayama et al. | |
| 2016/0258274 | A1 * | 9/2016 | Bittar | E21B 47/01 |
| 2016/0290124 | A1 * | 10/2016 | Chemali | E21B 43/164 |
| 2017/0038493 | A1 * | 2/2017 | Wu | G01V 3/28 |

FOREIGN PATENT DOCUMENTS

| | | |
|---|---|---|
| EP | 1057047 | 8/2008 |
| EP | 1335107 | 10/2008 |
| WO | 2011019351 | 2/2011 |
| WO | 2014100272 | 6/2014 |
| WO | 2014107708 | 7/2014 |
| WO | 2016144347 | 9/2016 |
| WO | 2016144349 | 9/2016 |

OTHER PUBLICATIONS

International Patent Application No. PCT/US2015/019868, International Search Report and Written Opinion, mailed Oct. 21, 2016, 9 pages.

Sommerfeld, Über die Fortpflanzung elektrodynamischer Wellen an längs eines Drahtes, Über die Fortpflanzung elektrodynamischer Wellen an längs eines Drahtes, Ann. der Physik und Chemie, vol. 67 (English Translation of title: Propagation of electro-dynamic waves along a cylindric conductor), Dec. 1899, pp. 233-290.

Wikipedia, Surface Wave, retrieved from the internet at http://en.wikipedia.org/wiki/Surface_wave, at least as early as Mar. 16, 2015, 7 pages.

Zenneck, Über die Fortpflanzung ebener elektromagnetischer Wellen längs einer ebenen Leiterfläche und ihre Beziehung zur drahtlosen Telegraphie, Ann. der Physik, vol. 23 (English Translation of title: "About the propagation of electromagnetic plane waves along a conductor plane and their relationship to wireless telegraphy"), Sep. 1907, pp. 846-866.

Iliarionov et al.; Sommerfeld wave (E wave) propagating along the cylindrical conductor with a large radius; retrieved from the internet at http://link.springer.com/article/10.1134/S106422691201007X, at least as early as Aug. 30, 2016, 2 pages.

Revolvy; Zenneck Wave, retrieved from the Internet at http://www.revolvy.com/main/index.php?s=Zenneck%20wave&item_type=topic at least as early as Aug. 30, 2016, 7 pages.

* cited by examiner

ANTENNA FOR DOWNHOLE COMMUNICATION USING SURFACE WAVES

CROSS-REFERENCE TO RELATED APPLICATIONS

This is a U.S. national phase under 35 U.S.C. 371 of International Patent Application No. PCT/US2015/019868, titled "Antenna for Downhole Communication Surface Waves" and filed Mar. 11, 2015, the entirety of which is incorporated herein by reference.

TECHNICAL FIELD

The present disclosure relates generally to devices for use in well systems. More specifically, but not by way of limitation, this disclosure relates to an antenna for downhole communication using surface waves.

BACKGROUND

A well system (e.g., an oil or gas well for extracting fluid or gas from a subterranean formation) can include various sensors. For example, a well system can include sensors for measuring well system parameters, such as temperature, pressure, resistivity, or sound levels. In some examples, the sensors can transmit data via cables to a well operator (e.g., typically at the surface of the well system). Cables can wear or fail, however, due to the harsh downhole environment or impacts with well tools. It can be challenging to communicate data from the sensors to the well surface efficiently.

DETAILED DESCRIPTION

Figure 1:
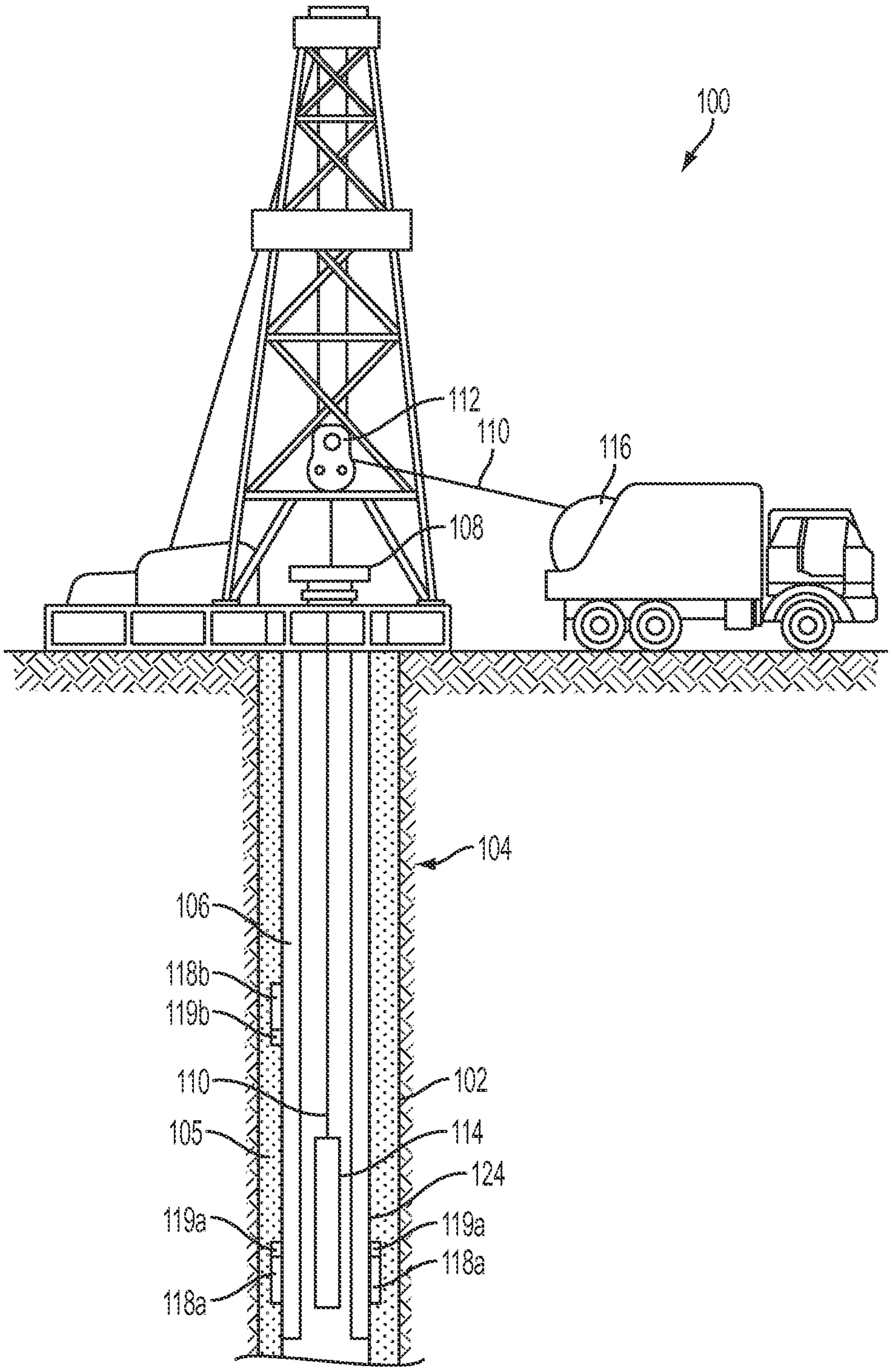
FIG. 1 is a cross-sectional view of an example of a well system that includes an antenna for downhole communication using surface waves.

Certain aspects and features of the present disclosure are directed to an antenna for downhole communication using surface waves. The antenna can include a cylindrically shaped (e.g., donut shaped) conductor with an inner diameter that is positioned coaxially around an outer surface of a casing string in a wellbore. For example, the antenna can include a toroid antenna or a solenoid antenna that is positioned coaxially around the outer surface of the casing string. Upon applying power to the cylindrically shaped conductor, the antenna can generate a magnetic field component of a surface wave (described in greater detail below) that can be used for wirelessly communicating data. In some examples, the antenna can include a pair of conductive plates. In some examples, the conductive plates can be positioned in parallel to one another with a gap between the conductive plates. Upon applying power across the pair of conductive plates, the antenna can generate an electric field component of the surface wave. In some examples, the conductive plates can be oriented along a longitudinal axis of the casing string.

The antenna can be electrically coupled to a transceiver. The transceiver can be positioned external to the casing string. The transceiver can be positioned external to the casing string if it is positioned on or external to an outer diameter or outer wall of the casing string. The transceiver can operate the antenna to generate surface waves. For example, a transceiver can transmit power to the cylindrically shaped conductor, the pair of conductive plates, or both at a frequency within a specific frequency band to transmit data. In some examples, the specific frequency band can be between 1 kHz and 700 kHz. This specific frequency band can include a range of frequencies that causes the antenna to generate surface waves. In some examples, transmitting power to the antenna at a frequency outside the specific frequency band can cause the antenna to generate inductive fields, rather than surface waves. The surface waves can propagate along the interface surface between the casing string and a cement sheath positioned in the wellbore (e.g., coupling the casing string to the walls of the wellbore). Another transceiver can detect the surface waves via an antenna to receive the data.

A surface wave can include an electromagnetic wave that propagates along an interface surface between two different media (e.g., two different solids or fluids) and does not produce electromagnetic radiation. The surface wave can include an electric field, a magnetic field, or both that are non-transverse (e.g., not orthogonal) to the direction of propagation. For example, the electric field, the magnetic field, or both can be oriented in the direction of propagation (e.g., parallel to the direction of propagation) of the electromagnetic wave. As another example, the electric field, the magnetic field, or both can be at an acute angle to the direction of propagation of the electromagnetic wave.

Surface waves can differ from other types of electromagnetic waves in multiple ways. For example, absorption of surface wave's energy can be strictly within the media through which the surface wave propagates. This absorption of energy can be very closely confined to a thin volume of material on either side of the interface surface. This is unlike other forms of electromagnetic waves, which may carry energy away from the media from which the electromagnetic waves originate or through which the electromagnetic waves propagate. For example, other forms of electromagnetic waves that propagate through, for example, a waveguide can leak energy through the waveguide and emit radiation into the media surrounding the waveguide.

In some examples, surface waves can travel farther distances with less attenuation than other methods of downhole wireless communication. For example, an inductive field transmitted into the subterranean formation of the wellbore can propagate through the subterranean formation to a receiving wireless communication device. But the inductive field can attenuate and distort based on the characteristics (e.g., the conductivity) of the subterranean formation, which may be impractical or infeasible to control. Surface waves can propagate along the interface surface between a cement sheath and a casing string in a wellbore, rather than through the subterranean formation. Because the cement sheath and the casing string are both man-made well components, it can be easier to control the characteristics (e.g., conductivity and geometry) of the interface surface. For example, the casing string can include a material (e.g., metal) and shape configured to improve or optimize surface wave propagation. This can allow wireless communications via surface waves to have improved power transmission efficiency over larger distances.

In some examples, the cylindrically shaped antenna can be positioned coaxially around the casing string via a cylindrically shaped substrate. The cylindrically shaped substrate can be positioned coaxially around the casing string. For example, the cylindrically shaped substrate can be positioned between the inner diameter of the cylindrically shaped conductor and an outer diameter of the outer surface of the casing string. The cylindrically shaped substrate can include an insulator (e.g., rubber or plastic) for electrically insulating the cylindrically shaped antenna from the casing string.

In some examples, the conductive plates can be positioned on the cylindrically shaped substrate. For example, the conductive plates can be positioned on the cylindrically shaped substrate and in parallel to one another for generating the electric field component of the surface wave. In other examples, the conductive plates can be positioned on a longitudinal substrate that is coupled (e.g., perpendicularly) to the cylindrically shaped substrate. The longitudinal substrate can be oriented along the longitudinal axis of the casing string or at an angle to the longitudinal axis of the casing string. For example, the conductive plates can be positioned at a longitudinal end of the longitudinal substrate and in parallel to one another for generating the electric field component of the surface wave.

In some examples, the pair of conductive plates can each be positioned on separate longitudinal substrates. The separate longitudinal substrates can each be coupled (e.g., perpendicularly) to the cylindrically shaped substrate. In some examples, the longitudinal substrates can each be oriented along the longitudinal axis of the casing string or at an angle to the longitudinal axis of the casing string. In some examples, each of the conductive plates can be oriented on a respective longitudinal substrate such that the pair of conductive plates are parallel to one another.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

FIG. 1 is a cross-sectional view of an example of a well system 100 that includes an antenna 119*a* for downhole communication using surface waves. The well system 100 includes a wellbore 102 extending through various earth strata. The wellbore 102 extends through a hydrocarbon bearing subterranean formation 104. A casing string 106 extends from the surface 108 to the subterranean formation 104. The casing string 106 can provide a conduit through which formation fluids, such as production fluids produced from the subterranean formation 104, can travel from the wellbore 102 to the surface 108. The casing string 106 can be coupled to the walls of the wellbore 102 via cement. For example, a cement sheath 105 can be positioned or formed between the casing string 106 and the walls of the wellbore 102 for coupling the casing string 106 to the wellbore 102.

The well system 100 can also include at least one well tool 114 (e.g., a formation-testing tool). The well tool 114 can be coupled to a wireline 110, slickline, or coiled tube that can be deployed into the wellbore 102. The wireline 110, slickline, or coiled tube can be guided into the wellbore 102 using, for example, a guide 112 or winch. In some examples, the wireline 110, slickline, or coiled tube can be wound around a reel 116.

The well system 100 can include transceivers 118*a-b* that can wirelessly communicate. In some examples, each of the transceivers 118*a-b* can be positioned on, partially embedded within, or fully embedded within the casing string 106, the cement sheath 105, or both. In some examples, the transceivers 118*a-b* can be positioned externally to the casing string 106. For example, the transceivers 118*a-b* can be positioned on an outer surface of the casing string 106, within the cement sheath 105, or within the subterranean formation 104. Positioning the transceivers 118*a-b* externally to the casing string 106 can be advantageous over positioning the transceivers 118*a-b* elsewhere in the well system 100, such as within the casing string 106, which can affect a drift diameter of the casing string 106. Additionally, positioning the transceivers 118*a-b* externally to the casing string 106 can allow the transceivers 118*a-b* to more accurately and efficiently detect characteristics of the subterranean formation 104, the cement sheath 105, and the casing string 106.

The transceivers 118*a-b* can be electrically coupled to antennas 119*a-b*. In some examples, an antenna 119*a* can be positioned coaxially around an outer surface of the casing string 106. In other examples, an antenna 119*b* can be positioned on or externally to the casing string 106. The transceivers 118*a-b* can use the antennas 119*a-b* to transmit data and receive data. For example, a transceiver 118*a* can apply power to an antenna 119*a* at a frequency within an onset frequency range, such as between 1 kHz to 1 MHz. This can cause the antenna 119*a* to generate a surface wave that can propagate along an interface surface 124 between the cement sheath 105 and the casing string 106. Another transceiver 118*b* can detect the presence of the surface wave via an antenna 119*b* and receive the data represented by the surface wave. In this manner, the transceivers 118*a-b* can wirelessly communicate using surface waves.

In some examples, the transceivers 118*a-b* can receive data and relay the data (or associated data) to other electronic devices. For example, a transceiver 118*a* can wirelessly transmit data to another transceiver 118*b*, which can be positioned farther uphole. The transceiver 118*b* can receive and wirelessly relay the data to still another transceiver (e.g., positioned even farther uphole), and so on, all using surface waves. In this manner, data can be wirelessly communicated in segments or "hops" to a destination (e.g., uphole or downhole). As another example, one transceiver 118*a* can wirelessly transmit data to another transceiver 118*b*. The transceiver 118*b* can receive relay the data to a destination via a wired interface (e.g., a wire positioned in the casing string 106 or the cement sheath 105). The destination can be, for example, at the surface 108 or elsewhere in the well system 100.

Figure 2:
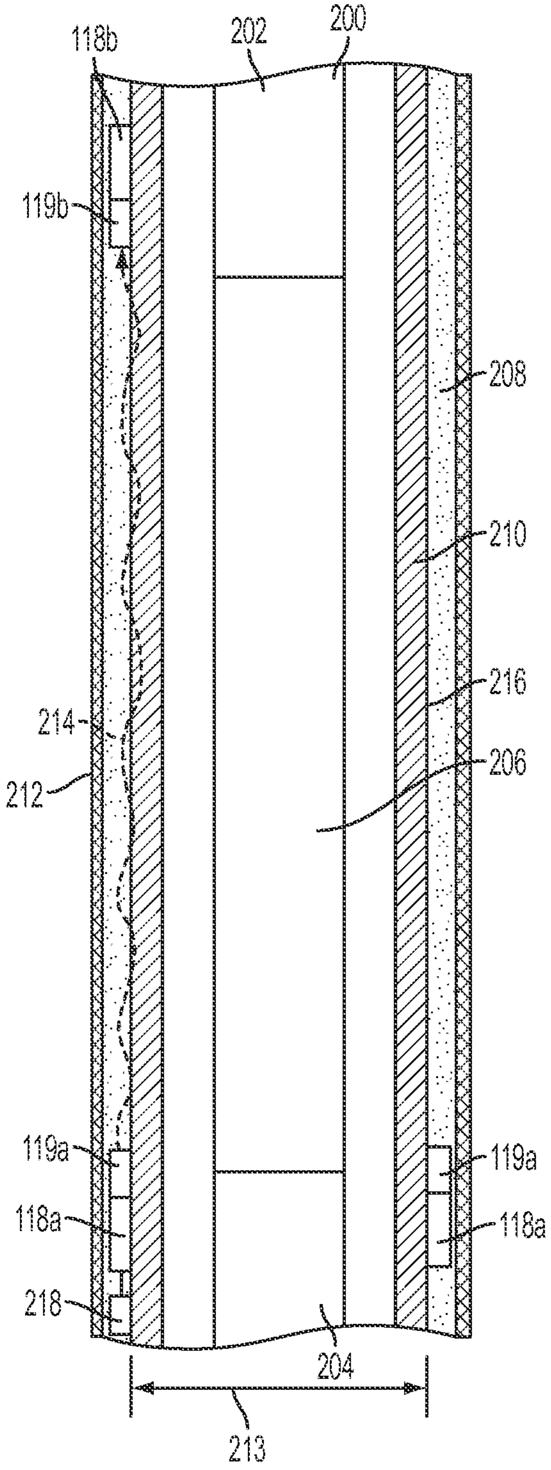
FIG. 2 is a cross-sectional side view of an example of part of a well system that includes an antenna for downhole communication using surface waves.

FIG. 2 is a cross-sectional side view of part of a system that includes an antenna 119*a* for downhole communication using surface waves 214. The system can include transceivers 118*a-b*, which can be coupled to or positioned externally to a casing string 210 in the well system. A cement sheath 208 can couple the casing string 210 to the subterranean formation 212. In some examples, a well tool 200 with three subsystems 202, 204, 206 can be positioned inside an inner diameter of the casing string 210.

The transceivers 118*a-b* can each be coupled to antennas 119*a-b*. The antennas 119*a-b* can be electrically coupled to or included within a transceiver 118*a*. The transceivers 118*a-b* can wirelessly communicate using surface waves 214. For example, a transceiver 118*a* can apply power to an antenna 119*a* at a frequency within a specific frequency range. In some examples, the specific frequency range can depend on the characteristics of the casing string 210. For example, the specific frequency range can depend on a diameter 213 of the casing string 210, the conductivity of the casing string 210, the magnetic permeability of the casing string 210, or any combination of these. The specific frequency range can also depend on characteristics of the cement sheath 208. For example, the specific frequency range can depend on the conductivity of the cement sheath 208, the dielectric constant of the cement sheath 208, the magnetic permeability of the cement sheath 208, or any combination of these. In one example, if the diameter of the casing string 210 is 196.85 millimeters and the cement sheath 208 has a conductivity of 1 semen/meter, the specific frequency range can be between 10 kHz and 700 kHz. Applying power to an antenna at a frequency within an specific frequency range can cause the transceiver 118*a* to generate a surface wave 214. The surface wave 214 can propagate along the interface surface 216 between the cement sheath 208 and the casing string 210.

More specifically, in some examples, assuming that the casing string 210 is cylindrical, and defining "z" as a z-axis that is an axis of symmetry of the casing string 210, a radial coordinate "r" as orthogonal to the z-axis, and a polar coordinate θ, the surfaces waves 214 can propagate along the casing string 210 according to the following mathematical equations:

$$H_\theta = 2i * A * \left(\frac{\epsilon 1}{\pi * r\sigma * \mu_0 * \sigma_{eff}}\right) * e^{-\sqrt{\frac{\omega * \mu_0 * \sigma_{eff}}{2}}(1+i)*z} * \left(\frac{1}{r}\right)$$

$$E_z = \frac{2i}{\pi} * A * e^{-\sqrt{\frac{\omega * \mu_0 * \sigma_{eff}}{2}}(1+i)*z} * \left(\frac{3i * \pi}{4} + \mathrm{Ln}\left[r\sqrt{r\sigma}\sqrt{\omega \mu_0 \sigma_{eff}}\right]\right)$$

$$E_r = -2 * A * \left(\frac{1}{\pi * r\sigma * \sqrt{\omega * \mu_0 * \sigma_{eff}}}\right) * e^{i * \frac{\pi}{4}} * e^{-\sqrt{\frac{\omega * \mu_0 * \sigma_{eff}}{2}}(1+i)*z} * \left(\frac{1}{r}\right)$$

where $H_\theta$ is the polar component of magnetic field intensity outside of the casing string 210; $E_z$ is the electric field component along the casing string 210; $E_r$ is the radial component of the electric field (e.g., orthogonal to the casing string 210); A is the source-dependent amplitude; $i=\sqrt{-1}$; $\in 1$ is the effective dielectric constant of the casing string 210; $\mu_0 = 4\pi(10^{-7})$ Henrys/meter, the permeability of free space;

$$\sigma_{eff} \equiv \frac{\sigma_1 * \sigma_2}{\sigma_1 + \sigma_2};\ r\sigma \equiv \frac{\sigma_2}{\sigma_1};$$

$\sigma_1$ is the conductivity (in mhos/m) of the material within the casing string 210; $\sigma_2$ is the conductivity (in mhos/m) of the material outside of the casing string 210; and ω is equal to 2 πƒ, where ƒ is the frequency in Hertz. In some examples, $\sigma_1 >> \sigma_2$ so that $\sigma_{eff} \sim \sigma_2$ and $r\sigma << 1$. In some examples, because $E_z$ is not vanishing, the electric field can be tilted with respect to a normal direction to the casing string 210.

The surface waves 214 can propagate along the z-axis according to the following mathematical equation:

$$e^{-\sqrt{\frac{\omega * \mu_0 * \sigma_{eff}}{2}} * z} * \left(\frac{1}{r}\right)$$

where $$\sqrt{\frac{\omega * \mu_0 * \sigma_{eff}}{2}}$$

is the reciprocal of the "skin depth" in the medium outside of the casing string 210. Because of this factor, in some examples, the frequency should be kept as low as possible while sustaining the required data rate.

In some examples, the transceivers 118*a-c* can generate surface waves 214 in which the z-axis component of electric field outside of the casing string 210 (which can be defined as $E_z$) and the radial component of electric field outside of the casing string 210 (which can be defined as $E_r$) are non-vanishing, and which has only a polar component of the magnetic field intensity (which can be defined as $H_e$).

In some examples, the transceivers 118*a-c* can generate surface waves 214 in which the z-axis component of the magnetic field outside the casing string 210 (which can be defined as $H_z$) and the radial component of the magnetic field outside of the casing string 210 (which can be defined as $H_r$) are non-vanishing, and which has only a polar component of the electric field (which can be defined as $E_\Theta$).

The surface wave 214 can include an electric field, a magnetic field, or both that can be oriented at an acute angle to a direction of propagation of the surface wave 214 (e.g., the direction from 118*a* to 118*b*). An acute angle can include an angle that is less than 90 degrees (e.g., between 0 and 89 degrees). For example, the electric field, magnetic field, or both can be oriented at an angle of 50 degrees to a direction of propagation of the surface wave 214. As another example, the electric field, magnetic field, or both can be at an acute angle when oriented at an angle of 130 degrees (e.g., in the counter-clockwise direction from the direction of propagation), because a supplementary angle (e.g., in the clockwise direction from the direction of propagation) is 50 degrees. Another transceiver 118*b* can receive the surface wave 214, effectuating wireless communication.

In some examples, the surface wave 214 can include a Zenneck surface wave, a Sommerfeld surface wave, a radial-cylindrical surface wave, an axial-cylindrical surface wave, or any combination of these. The type of surface wave 214 can depend on the geometry of the interface between the casing string 210 and the cement sheath 208. For example, the cylindrical geometries of the casing string 210 and the cement sheath 208 can allow the transceivers 118*a*, 118*b* to generate Zenneck surface waves and Sommerfeld surface waves, or radial-cylindrical surface waves and axially-cylindrical surface waves, respectively.

The characteristics of the surface wave 214 can also depend on the configuration of the antenna 119*a* transmitting the surface wave 214. For example, if the antenna 119*a* includes a cylindrically shaped conductor, such as a toroid antenna or a solenoid antenna, positioned coaxially around an outer surface of the casing string 210, the surface wave 214 can include a magnetic field component. The antenna 119*a* can additionally or alternatively include a pair of conductive plates for generating an electric field component of the surface wave 214. If the antenna 119*a* includes both the cylindrically shaped conductor and the pair of conductive plates, the surface wave 214 can include both magnetic field components and electric field components. This is described in further detail with respect to FIG. 3.

The transceivers 118*a-b* can communicate data via surface waves 214 using a variety of techniques. In some examples, the presence or absence of the surface waves 214 can communicate data. For example, one transceiver 118*a* can communicate data to another transceiver 118*b* by pulsing surface waves 214 in a particular sequence. In other examples, the transceivers 118*a*, 118*b* can modulate characteristics of the surface wave 214 to communicate data. For example, the transceivers 118*a*, 118*b* can modulate the amplitude, frequency, and phase of the surface wave 214 to communicate data.

In some examples, a transceiver 118*a*, 118*b* can include or be electrically coupled to a sensor 218. In the example shown in FIG. 2, the transceiver 118*a* is electrically coupled to a sensor 218 by a wire. Examples of the sensor 218 can include a pressure sensor, a temperature sensor, a microphone, a resistivity sensor, a vibration sensor, or a fluid flow sensor.

In some examples, the sensor 218 can transmit sensor signals to a processor (e.g., associated with a transceiver 118*a*). The sensor signals can be representative of sensor data. The processor can receive the sensor signals and cause the transceiver 118*a* to generate one or more surface waves associated with the sensor data. For example, the processor can transmit signals to an antenna 119*a* to generate surface waves 214 in a particular sequence representative of the sensor data. In other examples, the sensor 218 can additionally or alternatively transmit sensor signals to an electrical circuit. The electrical circuit can include operational amplifiers, integrated circuits, filters, frequency shifters, capacitors, inductors, and other electrical circuit components. The electrical circuit can receive the sensor signal and perform one or more functions (e.g., amplification, frequency shifting, and filtering) to cause the transceiver 118*a* to generate surface waves 214. For example, the electrical circuit can amplify and frequency shift the sensor signals into a specific frequency range configured to generate surface waves, and transmit the amplified and frequency-shifted signal to an antenna 119*a*. This can cause the antenna 119*a* to generate surface waves 214 that are representative of the sensor signals.

Figure 3:
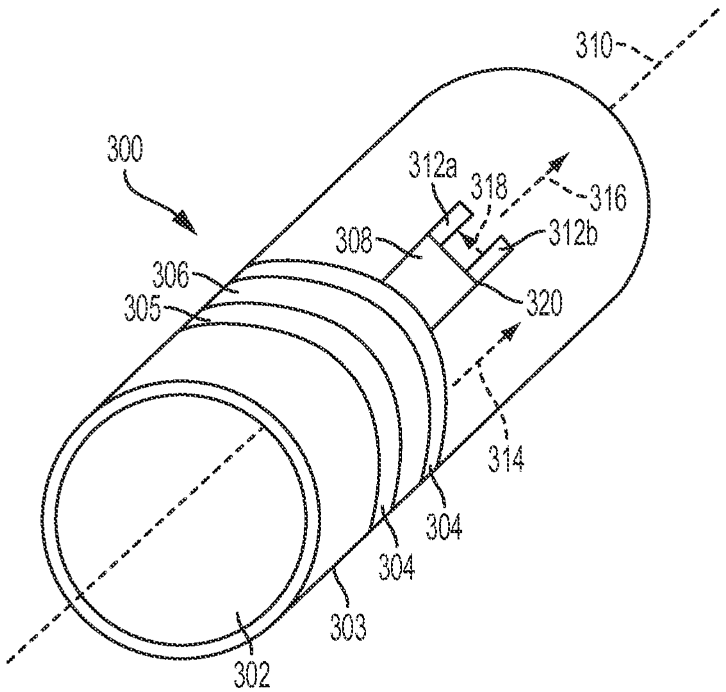
FIG. 3 is a perspective view of an example of an antenna for downhole communication using surface waves.

FIG. 3 is a perspective view of an example of an antenna 300 for downhole communication using surface waves. The antenna 300 can include a cylindrically shaped substrate 304. The cylindrically shaped substrate 304 can include an insulator material, such as rubber or plastic. The cylindrically shaped substrate 304 can be positioned coaxially around (and coupled to, such as with an epoxy, screws, nails, bolts, or other fastening devices) an outer surface 303 of a casing string 302. The cylindrically shaped substrate 304 can separate and electrically insulate a cylindrically shaped conductor 306 from the outer surface 303 of the casing string 302.

Figure 4:
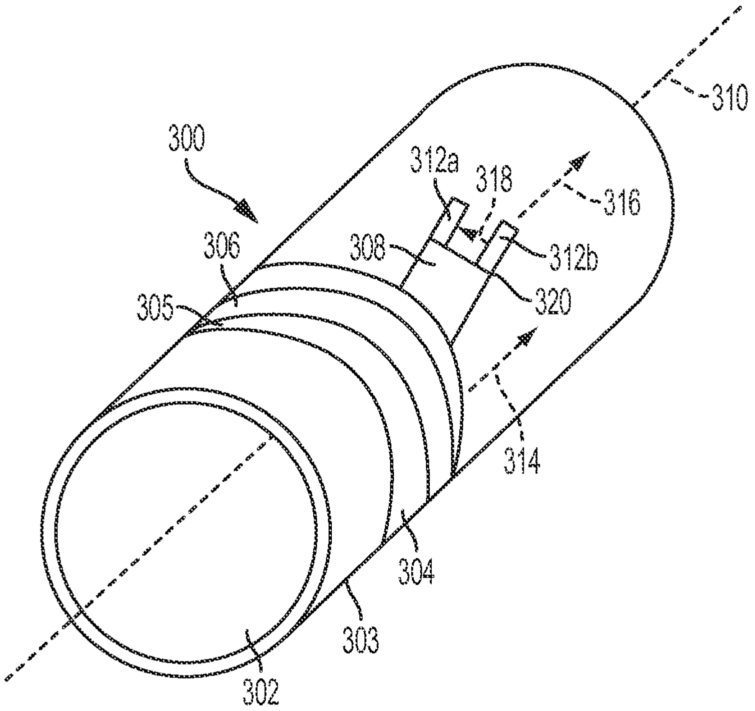
FIG. 4 is a perspective view of another example of an antenna for downhole communication using surface waves.

The antenna 300 can include the cylindrically shaped conductor 306. The cylindrically shaped conductor 306 can include a toroid antenna or a solenoid antenna. The cylindrically shaped conductor 306 can be positioned coaxially around (and coupled to) an outer surface 305 of the cylindrically shaped substrate 304. In some examples, the cylindrically shaped conductor 306 can be positioned perpendicularly to a longitudinal axis 310 of the casing string 302. In other examples (e.g., the example shown in FIG. 4), the cylindrically shaped conductor 306 can be positioned at an angle to the longitudinal axis 310 of the casing string. The cylindrically shaped conductor 306 can be positioned in any suitable orientation for generating a surface wave. In some examples, upon applying power to the cylindrically shaped conductor 306, the antenna 300 can generate a surface wave having a magnetic field component 314. The magnetic field component 314 (and the surface wave) can propagate in a direction along a longitudinal axis 310 of the casing string 302.

In some examples, the antenna 300 can include a longitudinal substrate 308. In some examples, the longitudinal substrate 308 can be positioned perpendicularly to the cylindrically shaped conductor 306 and along the longitudinal axis 310 of the casing string 302. In other examples (e.g., the example shown in FIG. 4), the longitudinal substrate 308 can be positioned at an angle to the longitudinal axis 310 of the casing string 302. The longitudinal substrate 308 can include an insulator material. The insulator material can be the same material as or different material from the cylindrically shaped substrate 304. The longitudinal substrate 308 can be coupled to the cylindrically shaped substrate 304.

The longitudinal substrate 308 can include a pair of conductive plates 312*a-b*. The pair of conductive plates 312*a-b* can include any suitable conductive material, such as lead, iron, gold, and copper. In some examples, the conductive plates 312*a-b* can include plates, loops, or strips of conductive material. In some examples, the pair of conductive plates 312*a-b* can be positioned at a longitudinal end 320 of the longitudinal substrate 308. The pair of conductive plates 312*a-b* can be positioned in parallel to one another or at an angle to one another. Upon applying power to the pair of conductive plates 312*a-b*, the antenna 300 can generate a surface wave having an electric field component 316. For example, upon applying a voltage 318 across the conductive plates 312*a-b*, the pair of conductive plates 312*a-b* can generate an electric field component 316 (and the surface wave) that can propagate in the direction along the longitudinal axis 310 of the casing string 302. The conductive plates 312*a-b* can be positioned in any suitable location on the longitudinal substrate 308 for generating a surface wave.

In some examples, the antenna 300 can include both the cylindrically shaped conductor 306 and the pair of conductive plates 312*a-b*. Power can be applied to both the cylindrically shaped conductor 306 and the pair of conductive plates 312*a-b* to generate a surface wave with magnetic field components 314 and electric field components 316. The surface wave can propagate in the direction along the longitudinal axis 310 of the casing string 302.

Figure 5:
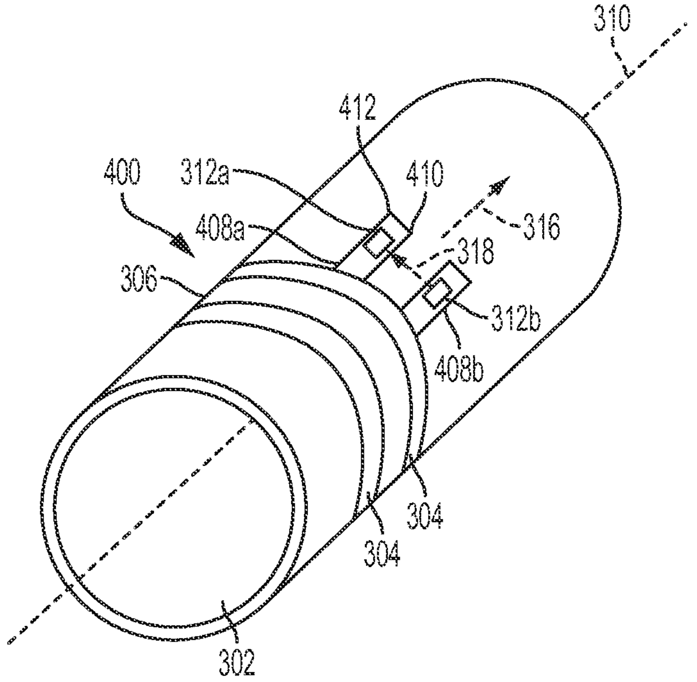
FIG. 5 is a perspective view of still another example of an antenna for downhole communication using surface waves.

FIG. 5 is a perspective view of an example of another antenna 400 for downhole communication using surface waves. The antenna 400 can include a cylindrically shaped conductor 306 positioned coaxially around an outer surface of a cylindrically shaped substrate 304, as described with respect to FIG. 3.

The antenna 400 can also include a pair of longitudinal substrates 408*a-b*. Each longitudinal substrate 408*a-b* can be positioned at an angle to (e.g., perpendicularly to) the cylindrically shaped conductor 306 and along the longitudinal axis 310 of the casing string 302. The longitudinal substrates 408*a-b* can include an insulator material, which can be the same material as or different material from the cylindrically shaped substrate 304. In some examples, the longitudinal substrates 408*a-b* can be coupled to the cylindrically shaped substrate 304.

Figure 6:
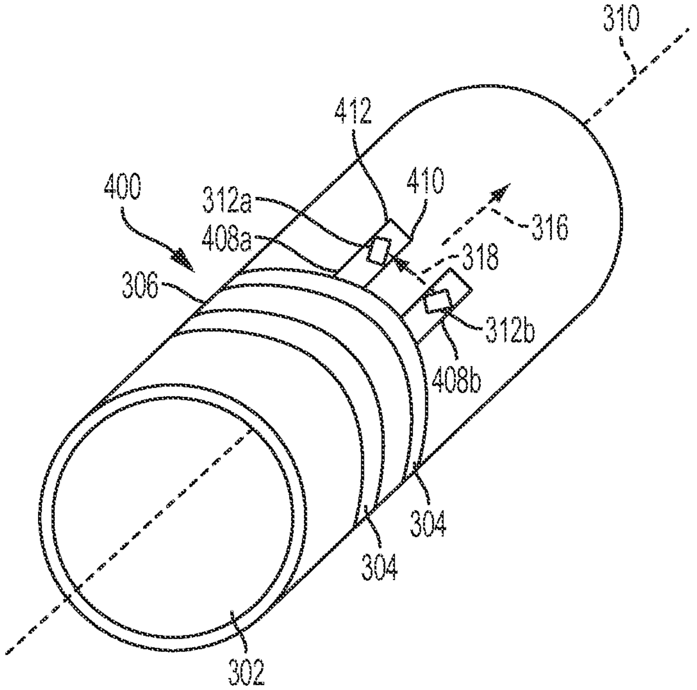
FIG. 6 is a perspective view of yet another example of an antenna for downhole communication using surface waves.
Figure 7:
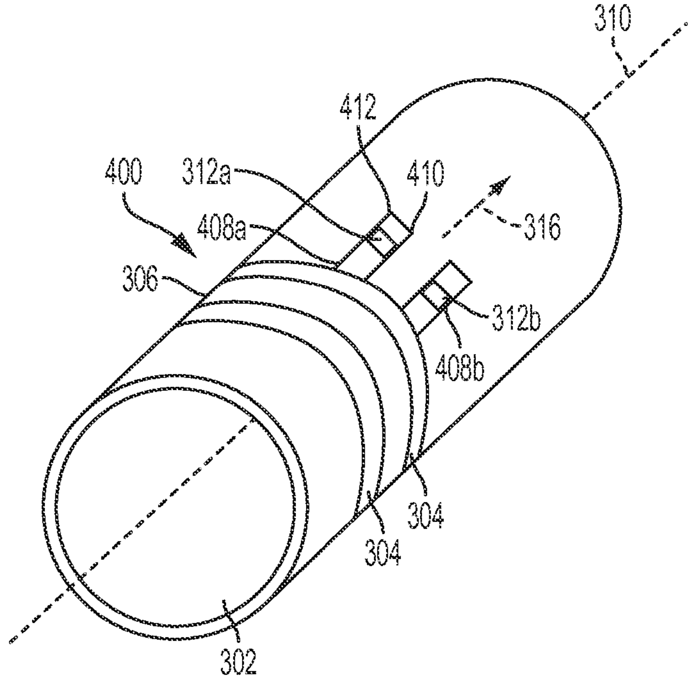
FIG. 7 is a perspective view of another example of an antenna for downhole communication using surface waves.

Each longitudinal substrate 408*a-b* can include a conductive plate 312*a-b*. The conductive plates 312*a-b* can be positioned in parallel to one another. In some examples, the conductive plates 312*a-b* can be oriented along the longitudinal axis 310 of the casing string 302. In other examples (e.g., the examples shown in FIG. 6), the conductive plates 312*a-b* can be oriented at an angle to the longitudinal axis 310 of the casing string 302. In one example (e.g., the examples shown in FIG. 7), the conductive plates 312*a-b* can be oriented perpendicularly to the longitudinal axis 310 of the casing string 302. Upon applying a voltage 318 across the conductive plates 312*a-b*, the pair of conductive plates 312*a-b* can generate an electric field component 316 of the surface wave. The electric field component 316 can propagate in a direction along the longitudinal axis 310 of the casing string 302.

Alternative configurations of the conductive plates 312*a-b* are possible. In some examples, each of the conductive plates 312*a-b* can be positioned adjacent to an interior edge 410 of a respective longitudinal substrate 408*a-b* (e.g., so that the conductive plates 312*a-b* are closer together). In other examples, each of the conductive plates 312*a-b* can be positioned adjacent to an exterior edge 412 of a respective longitudinal substrate 408*a-b* (e.g., so that the conductive plates 312*a-b* are farther apart). The conductive plates 312*a-b* can be positioned in any suitable location or orientation (e.g., on the longitudinal substrates 408*a-b*) for generating a surface wave.

Figure 8:
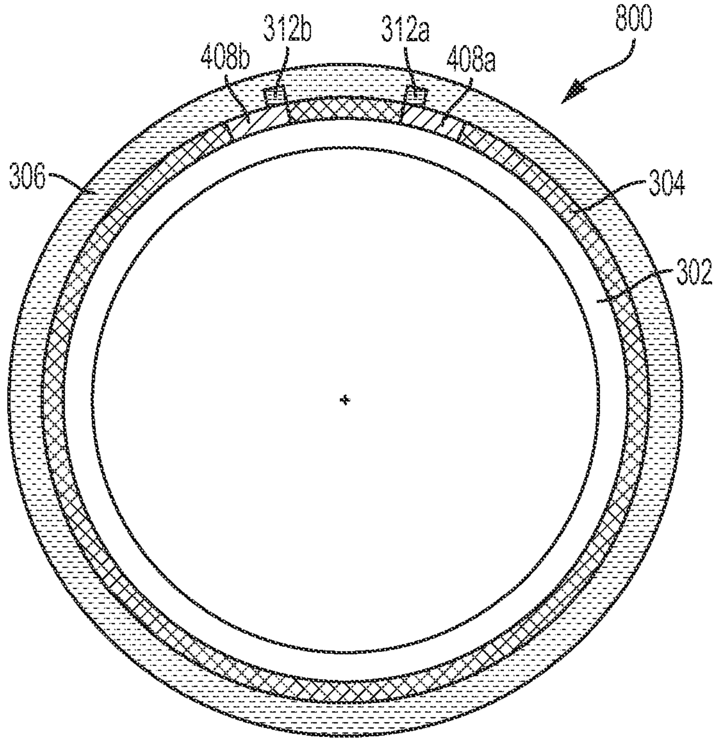
FIG. 8 is a cross-sectional end view of an example of an antenna for downhole communication using surface waves.

FIG. 8 is a cross-sectional end view of an example of an antenna 800 for downhole communication using surface waves. As described above, the antenna 800 can include a cylindrically shaped conductor 306 positioned coaxially around and coupled to a cylindrically shaped substrate 304. The cylindrically shaped substrate 304 can be positioned coaxially around and coupled to an outer surface of a casing string 302.

In some examples, the antenna 800 can also include a pair of longitudinal substrates 408*a-b*. In this example, the longitudinal substrates 408*a-b* are coupled to and oriented perpendicularly to the cylindrically shaped substrate 304. As noted above, in other examples, the longitudinal substrates 408*a-b* can be oriented at any suitable angle. In some examples, the longitudinal substrates 408*a-b* can be in parallel to one another and positioned along a longitudinal axis (e.g., the direction out of the page) of the casing string 302.

Figure 9:
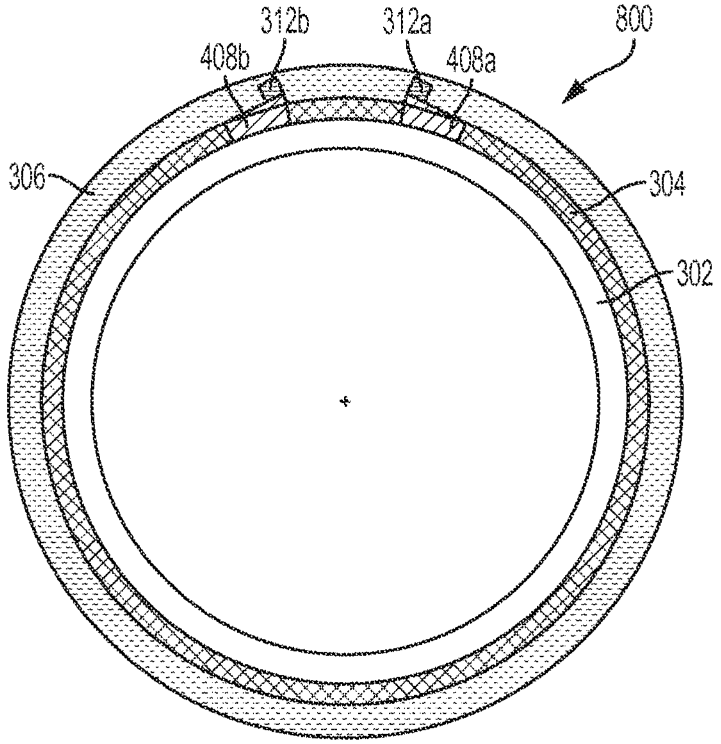
FIG. 9 is a cross-sectional end view of another example of an antenna for downhole communication using surface waves.

Conductive plates 312*a-b* can be positioned on the longitudinal substrates 408*a-b*. Each longitudinal substrate 408*a-b* can include a conductive plate 312*a-b*. In some examples, the conductive plates 312*a-b* can be oriented toward one another and/or substantially in parallel to the surface of the casing string 302. In other examples (e.g., the example shown in FIG. 9), the conductive plates 312*a-b* can be oriented at an angle to the surface of the casing string 302.

Figure 10:
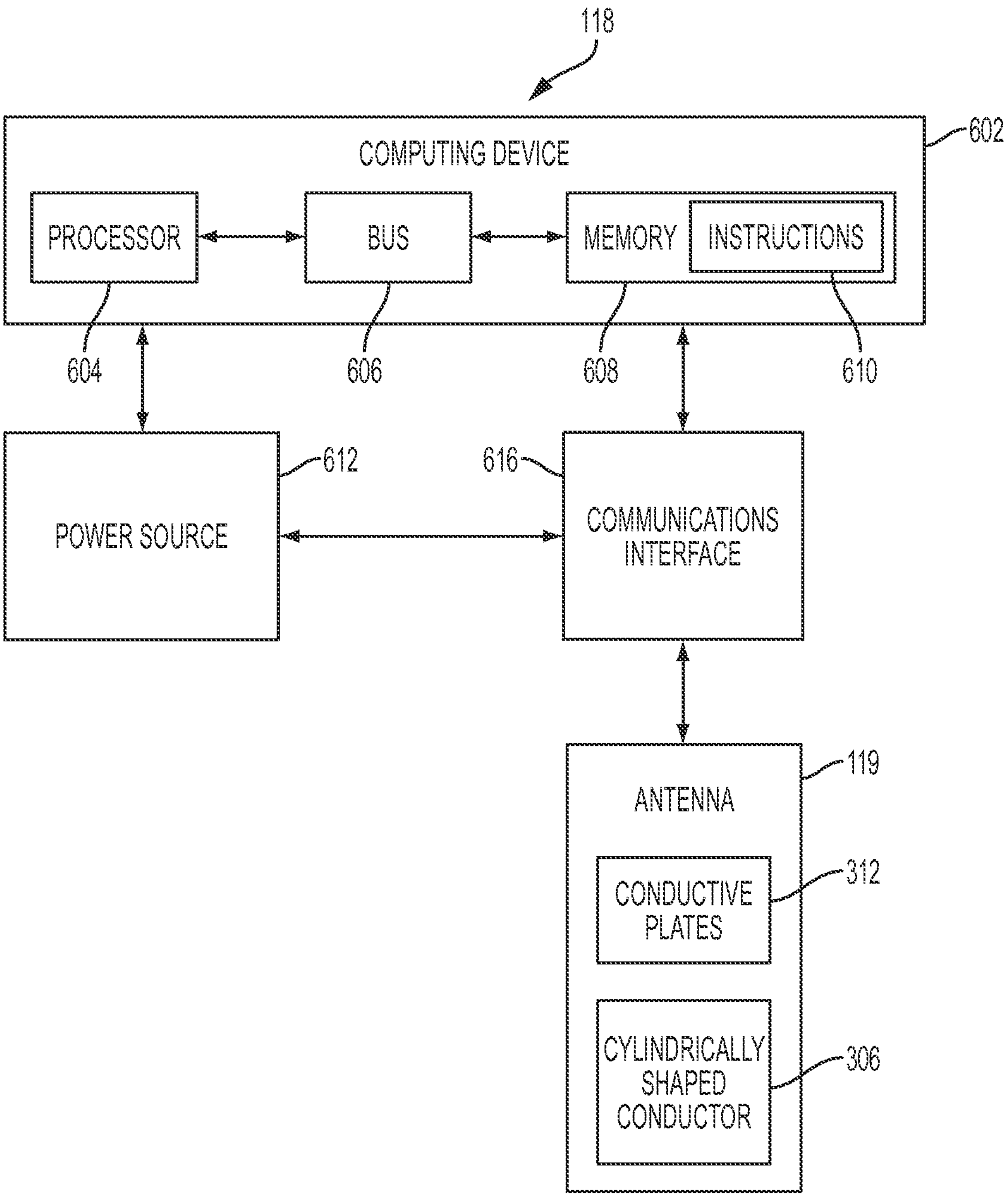
FIG. 10 is a block diagram of an example of a transceiver for operating an antenna for downhole wireless communications using surface waves.

FIG. 10 is a block diagram of an example of a transceiver 118 for operating an antenna 119 for downhole wireless communications using surface waves. In some examples, the components shown in FIG. 10 (e.g., the computing device 602, power source 612, communications interface 616, and antenna 119) can be integrated into a single structure. For example, the components can be within a single housing. In other examples, the components shown in FIG. 10 can be distributed and in electrical communication with each other. For example, the components shown in FIG. 10 can be positioned in separate housings and in electrical communication with each other.

The transceiver 118 can include a computing device 602. The computing device 602 can include a processor 604, a memory 608, and a bus 606. The processor 604 can execute one or more operations for operating a transceiver. The processor 604 can execute instructions 610 stored in the memory 608 to perform the operations. The processor 604 can include one processing device or multiple processing devices. Non-limiting examples of the processor 604 include a Field-Programmable Gate Array ("FPGA"), an application-specific integrated circuit ("ASIC"), a microprocessor, etc.

The processor 604 can be communicatively coupled to the memory 608 via the bus 606. The non-volatile memory 608 may include any type of memory device that retains stored information when powered off. Non-limiting examples of the memory 608 include electrically erasable and programmable read-only memory ("EEPROM"), flash memory, or any other type of non-volatile memory. In some examples, at least some of the memory 608 can include a medium from which the processor 604 can read the instructions 610. A computer-readable medium can include electronic, optical, magnetic, or other storage devices capable of providing the processor 604 with computer-readable instructions or other program code. Non-limiting examples of a computer-readable medium include (but are not limited to) magnetic disk(s), memory chip(s), ROM, random-access memory ("RAM"), an ASIC, a configured processor, optical storage, or any other medium from which a computer processor can read instructions. The instructions 610 can include processor-specific instructions generated by a compiler or an interpreter from code written in any suitable computer-programming language, including, for example, C, C++, C#, etc.

The transceiver 118 can include a power source 612. The power source 612 can be in electrical communication with the computing device 602, the communications interface 616, and the antenna 119. In some examples, the power source 612 can include a battery (e.g. for powering the transceiver 118). In other examples, the transceiver 118 can be coupled to and powered by an electrical cable (e.g., a wireline).

Additionally or alternatively, the power source 612 can include an AC signal generator. The computing device 602 can operate the power source 612 to apply a transmission signal to the antenna 119. For example, the computing device 602 can cause the power source 612 to apply a voltage with a frequency within an onset frequency range to the antenna 119. This can cause the antenna 119 to generate a surface wave, which can be transmitted to another transceiver 118. In other examples, the computing device 602, rather than the power source 612, can apply the transmission signal to the antenna 119.

The transceiver 118 can include a communications interface 616. The communications interface 616 can include or can be coupled to the antenna 119. In some examples, part or all of the communications interface 616 can be implemented in software. For example, the communications interface 616 can include instructions 610 stored in memory 608.

The communications interface 616 can receive data via the antenna 119. For example, the communications interface 616 can detect surface waves via the antenna 119. In some examples, the communications interface 616 can amplify, filter, demodulate, frequency shift, and otherwise manipulate the detected surface waves. The communications interface 616 can transmit a signal associated with the detected surface waves to the processor 604. In some examples, the processor 604 can receive and analyze the signal to retrieve data associated with the detected surface waves.

In some examples, the processor 604 can analyze the data and perform one or more functions. For example, the processor 604 can generate a response based on the data. The processor 604 can cause a response signal associated with the response to be transmitted to the communications interface 616. The communications interface 616 can generate surface waves via the antenna 119 to communicate the response to another transceiver 118 or communications device. In this manner, the processor 604 can receive, analyze, and respond to communications from another transceiver 118.

The communications interface 616 can transmit data via the antenna 119. For example, the communications interface 616 can transmit surface waves that are modulated by data via the antenna 119. In some examples, the communications interface 616 can receive signals (e.g., associated with data to be transmitted) from the processor 604 and amplify, filter, modulate, frequency shift, and otherwise manipulate the signals. The communications interface 616 can transmit the manipulated signals to the antenna 119. The antenna 119 can receive the manipulated signals and responsively generate surface waves that carry the data.

The antenna 119 can include a pair of conductive plates 312 and a cylindrically shaped conductor 306. The power source 612 or the computing device 602 can apply power (e.g., via the communications interface 616) at a frequency within an onset frequency range to the pair of conductive plates 312, the cylindrically shaped conductor 306, or both. This can cause the antenna 119 to generate a surface wave with a magnetic field component, an electric field component, or both.

Figure 11:
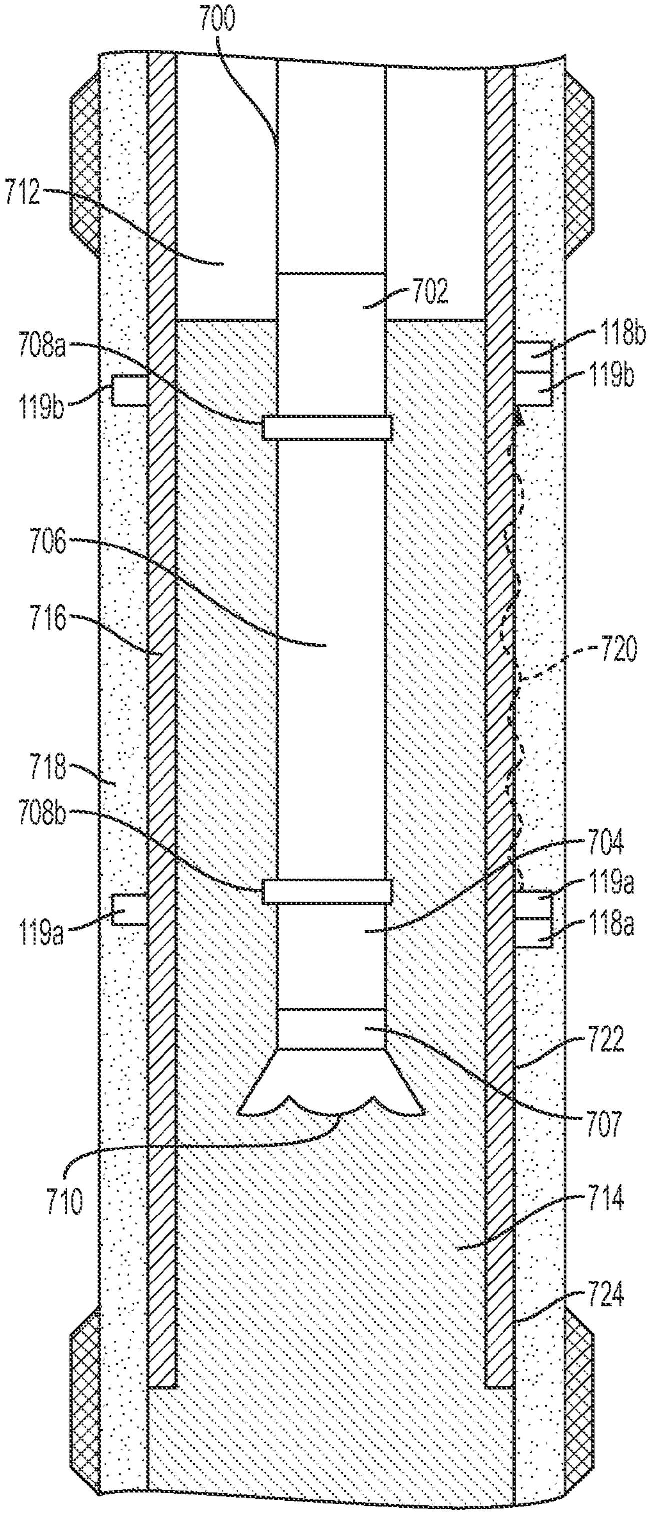
FIG. 11 is a cross-sectional side view of another example of part of a well system that includes an antenna for downhole communication using surface waves.

FIG. 11 is a cross-sectional side view of another example of a part of a well system that includes an antenna 119*a* for downhole communication using surface waves 720. In this example, the well system includes a wellbore. The wellbore can include a casing string 716 and a cement sheath 718. An interface surface 722 can couple the casing string 716 to the cement sheath 718. The wellbore can include fluid 714. The fluid 714 (e.g., mud) can flow in an annulus 712 positioned between a well tool 700 and a wall of the casing string 716.

The well tool 700 can be positioned in the wellbore. In some examples, the well tool 700 is a logging-while-drilling tool. The well tool 700 can include various subsystems 702, 704, 706, 707. For example, the well tool 700 can include a subsystem 702 that includes a communication subsystem. The well tool 700 can also include a subsystem 704 that includes a saver subsystem or a rotary steerable system. A tubular section or an intermediate subsystem 706 (e.g., a mud motor or measuring-while-drilling module) can be positioned between the other subsystems 702, 704. In some examples, the well tool 700 can include a drill bit 710 for drilling the wellbore. The drill bit 710 can be coupled to another tubular section or intermediate subsystem 707 (e.g., a measuring-while-drilling module or a rotary steerable system).

The well tool 700 can also include tubular joints 708*a*, 708*b*. Tubular joint 708*a* can prevent a wire from passing between one subsystem 702 and the intermediate subsystem 706. Tubular joint 708*b* can prevent a wire from passing between the other subsystem 704 and the intermediate subsystem 706. The tubular joints 708*a*, 708*b* may make it challenging to communicate data through the well tool 700. It may be desirable to communicate data externally to the well tool 700, for example, using transceivers 118*a-b*.

In some examples, transceivers 118*a-b* can be positioned on the casing string 716. The transceivers 118*a-b* can allow for wireless communication of data using surface waves. The transceivers 118*a-b* can include antenna 119*a-b*. The antennas 119*a-b* can each include a cylindrically shaped conductor (e.g., a toroid antenna or solenoid antenna), a pair of conductive plates, or both. The antennas 119*a-b* can be positioned on the casing string 716. In some examples, an antennas 119*a-b* can be positioned coaxially around the casing string 716. The antennas 119*a-b* can be electrically coupled to transceivers 118*a-b* (e.g., by a wire extending through the casing string 716 or the cement sheath 718) and positioned coaxially around an outer surface 724 of the casing string 716. As discussed above, the transceivers 118*a-b* can wirelessly communicate by generating surface waves 720 that propagate along the interface surface 722.

In some aspects, an antenna for downhole communication using surface waves is provided according to one or more of the following examples:

Example #1

An assembly can include a casing string with an outer surface. The assembly can also include an antenna for wirelessly communicating data by generating a surface wave that propagates along an interface surface. The antenna can be positioned coaxially around the casing string. The antenna can include a cylindrically shaped conductor that is positionable coaxially around the outer surface of the casing string for generating a magnetic field component of the surface wave that is non-transverse to a direction of propagation of the surface wave along the interface surface. The antenna can also include a pair of conductive plates positioned at an angle to the cylindrically shaped conductor for generating an electric field component of the surface wave.

Example #2

The assembly of Example #1 may feature the antenna being operable to generate the electric field component such that the electric field component is non-transverse to the direction of propagation of the surface wave along the interface surface.

Example #3

The assembly of any of Examples #1-2 may feature the interface surface being between the casing string and a cement sheath.

Example #4

The assembly of any of Examples #1-3 may feature the angle being 0 degrees or 90 degrees.

Example #5

The assembly of any of Examples #1-4 may feature the antenna being operable to generate the surface wave responsive to receiving a signal with a frequency between 1 kHz and 1 MHz at the pair of conductive plates and the cylindrically shaped conductor.

Example #6

The assembly of any of Examples #1-5 may feature a pair of longitudinal substrates that are positioned in parallel to one another and perpendicular to the cylindrically shaped conductor so that the pair of longitudinal substrates extend along a longitudinal axis of the casing string. Each conductive plate in the pair of conductive plates can be positioned on a different longitudinal substrate in the pair of longitudinal substrates.

Example #7

The assembly of any of Examples #1-6 may feature a cylindrically shaped substrate that is positioned coaxially around the outer surface of the casing string. The cylindrically shaped conductor can be positioned on the cylindrically shaped substrate and a pair of longitudinal substrates can be coupled to the cylindrically shaped substrate.

Example #8

The assembly of any of Examples #1-7 may feature a longitudinal substrate positioned perpendicularly to the cylindrically shaped conductor and extending along a longitudinal axis of the casing string. The pair of conductive plates can be positioned at a longitudinal end of the longitudinal substrate and in parallel to one another.

Example #9

A system can include a transceiver positioned externally to a casing string. The system can also include an antenna communicatively coupled to the transceiver for wirelessly transmitting data using surface waves. The antenna can include a cylindrically shaped conductor that is positionable coaxially around an outer surface of the casing string for generating magnetic field components of the surface waves that are non-transverse to a direction of propagation of the surface waves along an interface surface. The antenna can also include a pair of conductive plates positioned at an angle to the cylindrically shaped conductor for generating electric field components of the surface waves.

Example #10

The system of Example #9 may feature the antenna being operable to generate the electric field components such that the electric field components are non-transverse to the direction of propagation of the surface waves along the interface surface.

Example #11

The system of any of Examples #9-10 may feature the interface surface being between the casing string and a cement sheath.

Example #12

The system of any of Examples #9-11 may feature the angle being 0 degrees or 90 degrees.

Example #13

The system of any of Examples #9-12 may feature a pair of longitudinal substrates that are positioned in parallel to one another and perpendicular to the cylindrically shaped conductor to that that the pair of longitudinal substrates extend along a longitudinal axis of the casing string. Each conductive plate in the pair of conductive plates can be positioned on a different longitudinal substrate in the pair of longitudinal substrates.

Example #14

The system of any of Examples #9-13 may feature a cylindrically shaped substrate that is positioned coaxially around the outer surface of the casing string. The cylindrically shaped conductor can be positioned on the cylindrically shaped substrate and a pair of longitudinal substrates can be coupled to the cylindrically shaped substrate.

Example #15

The system of any of Examples #9-14 may feature may feature a longitudinal substrate positioned perpendicularly to the cylindrically shaped conductor and extending along a longitudinal axis of the casing string. The pair of conductive plates can be positioned at a longitudinal end of the longitudinal substrate and in parallel to one another.

Example #16

An antenna that is positionable in a wellbore can include a cylindrically shaped substrate that is positioned coaxially around an outer surface of a casing string. The antenna can also include a cylindrically shaped conductor that is positioned coaxially around and coupled to the cylindrically shaped substrate for generating a magnetic field component of a surface wave. The antenna can also include a longitudinal substrate that is coupled to and positioned at an angle to the cylindrically shaped substrate. The antenna can further include a pair of conductive plates coupled to the longitudinal substrate and oriented for generating an electric field component of the surface wave. The magnetic field component and the electric field component can be non-transverse to a direction of propagation of the surface wave along an interface surface.

Example #17

The antenna of Example #16 may feature the interface surface being between the casing string and a cement sheath.

Example #18

The antenna of any of Examples #16-17 may feature the angle being 0 degrees or 90 degrees.

Example #19

The antenna of any of Examples #16-18 may feature the pair of conductive plates being positioned at a longitudinal end of the longitudinal substrate and in parallel to one another.

Example #20

The antenna of any of Examples #16-19 may feature the longitudinal substrate including a first longitudinal substrate and a second longitudinal substrate that are positioned in parallel to one another. A first conductive plate in the pair of conductive plates can be positioned on the first longitudinal substrate and a second conductive plate in the pair of conductive plates can be positioned on the second longitudinal substrate.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. An assembly comprising:

a casing string with an outer surface; and an antenna for wirelessly communicating data by generating a surface wave that propagates along an interface surface, the antenna positioned coaxially around the casing string and comprising:

a cylindrically shaped conductor that is positionable coaxially around the outer surface of the casing string for generating a magnetic field component of the surface wave that is non-transverse to a direction of propagation of the surface wave along the interface surface; and a pair of conductive plates positioned at an angle to the cylindrically shaped conductor for generating an electric field component of the surface wave.

2. The assembly of claim 1, wherein the antenna is operable to generate the electric field component such that the electric field component is non-transverse to the direction of propagation of the surface wave along the interface surface.

3. The assembly of claim 2, wherein the interface surface is between the casing string and a cement sheath.

4. The assembly of claim 1, wherein the angle is 0 degrees or 90 degrees.

5. The assembly of claim 1, wherein the antenna is operable to generate the surface wave responsive to receiving a signal with a frequency between 1 kHz and 1 MHz at the pair of conductive plates and the cylindrically shaped conductor.

6. The assembly of claim 1, further comprising a pair of longitudinal substrates that are positioned in parallel to one another and perpendicular to the cylindrically shaped conductor so that the pair of longitudinal substrates extend along a longitudinal axis of the casing string, wherein each conductive plate in the pair of conductive plates is positioned on a different longitudinal substrate in the pair of longitudinal substrates.

7. The assembly of claim 6, further comprising a cylindrically shaped substrate that is positioned coaxially around the outer surface of the casing string, wherein the cylindrically shaped conductor is positioned on the cylindrically shaped substrate and the pair of longitudinal substrates are coupled to the cylindrically shaped substrate.

8. The assembly of claim 1, further comprising a longitudinal substrate positioned perpendicularly to the cylindrically shaped conductor and extending along a longitudinal axis of the casing string, wherein the pair of conductive plates are positioned at a longitudinal end of the longitudinal substrate and in parallel to one another.

9. A system comprising:

a transceiver positioned externally to a casing string; and an antenna communicatively coupled to the transceiver for wirelessly transmitting data using surface waves, the antenna comprising:

a cylindrically shaped conductor that is positionable coaxially around an outer surface of the casing string for generating magnetic field components of the surface waves that are non-transverse to a direction of propagation of the surface waves along an interface surface; and a pair of conductive plates positioned at an angle to the cylindrically shaped conductor for generating electric field components of the surface waves.

10. The system of claim 9, wherein the antenna is operable to generate the electric field components such that the electric field components are non-transverse to the direction of propagation of the surface waves along the interface surface.

11. The system of claim 9, wherein the interface surface is between the casing string and a cement sheath.

12. The system of claim 9, wherein the angle is 0 degrees or 90 degrees.

13. The system of claim 9, further comprising a pair of longitudinal substrates that are positioned in parallel to one another and perpendicular to the cylindrically shaped conductor to that that the pair of longitudinal substrates extend along a longitudinal axis of the casing string, wherein each conductive plate in the pair of conductive plates is positioned on a different longitudinal substrate in the pair of longitudinal substrates.

14. The system of claim 13, further comprising a cylindrically shaped substrate that is positioned coaxially around the outer surface of the casing string, wherein the cylindrically shaped conductor is positioned on the cylindrically shaped substrate and the pair of longitudinal substrates are coupled to the cylindrically shaped substrate.

15. The system of claim 9, further comprising a longitudinal substrate positioned perpendicularly to the cylindrically shaped conductor and extending along a longitudinal axis of the casing string, wherein the pair of conductive plates are positioned at a longitudinal end of the longitudinal substrate and in parallel to one another.

16. An antenna that is positionable in a wellbore, the antenna comprising:

a cylindrically shaped substrate that is positioned coaxially around an outer surface of a casing string;

a cylindrically shaped conductor that is positioned coaxially around and coupled to the cylindrically shaped substrate for generating a magnetic field component of a surface wave;

a longitudinal substrate that is coupled to and positioned at an angle to the cylindrically shaped substrate; and a pair of conductive plates coupled to the longitudinal substrate and oriented for generating an electric field component of the surface wave, wherein the magnetic field component and the electric field component are non-transverse to a direction of propagation of the surface wave along an interface surface.

17. The antenna of claim 16, wherein the interface surface is between the casing string and a cement sheath.

18. The antenna of claim 16, wherein the angle is 0 degrees or 90 degrees.

19. The antenna of claim 16, wherein the pair of conductive plates are positioned at a longitudinal end of the longitudinal substrate and in parallel to one another.

20. The antenna of claim 16, wherein the longitudinal substrate comprises a first longitudinal substrate and a second longitudinal substrate that are positioned in parallel to one another, and wherein a first conductive plate in the pair of conductive plates is positioned on the first longitudinal substrate and a second conductive plate in the pair of conductive plates is positioned on the second longitudinal substrate.

* * * * *